United States Patent
Nakasugi

(10) Patent No.: US 8,482,242 B2
(45) Date of Patent: Jul. 9, 2013

(54) ROTARY DRIVE DEVICE

(75) Inventor: Mikio Nakasugi, Tama (JP)

(73) Assignee: Canon Kabushiki Kaisha, Tokyo (JP)

( * ) Notice: Subject to any disclaimer, the term of this patent is extended or adjusted under 35 U.S.C. 154(b) by 212 days.

(21) Appl. No.: 13/032,497

(22) Filed: Feb. 22, 2011

(65) Prior Publication Data

US 2011/0204838 A1 Aug. 25, 2011

(30) Foreign Application Priority Data

Feb. 23, 2010 (JP) ................................ 2010-037527

(51) Int. Cl.
*G05B 11/00* (2006.01)

(52) U.S. Cl.
USPC . 318/689; 318/432; 318/568.12; 318/568.22; 700/157; 700/245; 901/9; 901/15

(58) Field of Classification Search
USPC .................... 318/432, 689, 615, 609, 568.12, 318/568.22; 700/157, 245; 901/9, 15, 46
See application file for complete search history.

(56) References Cited

U.S. PATENT DOCUMENTS

| | | | | |
|---|---|---|---|---|
| 4,620,450 A * | 11/1986 | Yamaguchi | ................. | 73/862.23 |
| 5,049,028 A * | 9/1991 | Asano et al. | ................. | 414/730 |
| 5,062,673 A * | 11/1991 | Mimura | ................. | 294/111 |
| 5,165,841 A * | 11/1992 | Asano et al. | ................. | 414/729 |
| 5,243,526 A * | 9/1993 | Ito et al. | ................. | 701/90 |
| 5,307,447 A * | 4/1994 | Asano et al. | ................. | 700/255 |
| 5,355,064 A * | 10/1994 | Yoshino et al. | ................. | 318/568.12 |
| 5,404,086 A * | 4/1995 | Takenaka et al. | ................. | 318/568.12 |
| 5,986,424 A * | 11/1999 | Nakatsuka et al. | ................. | 318/568.22 |
| 6,865,463 B2 * | 3/2005 | Suzuki | ................. | 701/43 |
| 7,325,646 B2 * | 2/2008 | Asada | ................. | 180/444 |
| 7,394,214 B2 * | 7/2008 | Endo et al. | ................. | 318/432 |
| 7,765,023 B2 * | 7/2010 | Oaki et al. | ................. | 700/157 |
| 7,849,957 B2 * | 12/2010 | Hara et al. | ................. | 180/446 |
| 2003/0100981 A1 * | 5/2003 | Suzuki | ................. | 701/43 |
| 2003/0111974 A1 * | 6/2003 | Suzuki | ................. | 318/661 |
| 2004/0188172 A1 * | 9/2004 | Asada | ................. | 180/446 |
| 2004/0193344 A1 * | 9/2004 | Suzuki | ................. | 701/41 |
| 2005/0246061 A1 * | 11/2005 | Oaki et al. | ................. | 700/245 |
| 2006/0071625 A1 * | 4/2006 | Nakata et al. | ................. | 318/568.12 |
| 2012/0215357 A1 * | 8/2012 | Igarashi et al. | ................. | 700/258 |

FOREIGN PATENT DOCUMENTS

| JP | 5-252779 A | 9/1993 |
|---|---|---|
| JP | 2003-018880 A | 1/2003 |
| JP | 2006-141101 A | 6/2006 |

* cited by examiner

*Primary Examiner* — Paul Ip
(74) *Attorney, Agent, or Firm* — Canon USA Inc. IP Division

(57) ABSTRACT

A first angle-detecting unit outputs a first rotation angle according to the rotation angle of a rotation shaft of a servo motor. A second angle-detecting unit outputs a second rotation angle according to a rotation angle of a rotation shaft of a reduction gear. A torque calculation unit calculates the torque acting on the rotation shaft of the reduction gear according to the angle difference between the first rotation angle and the second rotation angle. An angle-control unit generates a torque reference value according to the difference between the angle reference value and the second rotation angle. A torque control unit generates a current reference value according to the difference between the torque reference value and the torque.

3 Claims, 4 Drawing Sheets

ROTARY DRIVE DEVICE

BACKGROUND OF THE INVENTION

1. Field of the Invention

The present invention relates to rotary drive devices for driving joints, such as links and hands, of a robot arm, and, more specifically, it relates to rotary drive devices for rotationally driving joints via reduction gears.

2. Description of the Related Art

A typical conventional rotary drive device for driving a link or hand of a robot arm uses an AC or DC servo motor and is connected to the object to be driven, with a reduction gear provided on the output side of the motor to obtain a high-output torque. In recent years, robot arms are required to achieve higher precision, higher speed, and higher output. Japanese Patent Laid-Open No. 2006-141101 proposes a rotary drive device that uses a reduction gear, in which the position of the origin with respect to the rotation shaft of the reduction gear is detected. Furthermore, Japanese Patent Laid-Open No. 5-252779 discloses a control structure that controls the torque of a servo motor according to the output from a torque sensor attached to the output side of a reduction gear to suppress the vibration of the robot arm. Moreover, Japanese Patent Laid-Open No. 2003-18880 discloses a rotary drive device in which a rotational-speed detecting unit is provided on each of the rotation shaft of the motor and the rotation shaft of the reduction gear so as to bring the rotational speed of the rotation shaft of the reduction gear to a preset speed.

However, because the rotary drive device rotationally drives the object to be driven via the reduction gear, an inner mechanism of the reduction gear may be deformed or distorted, due to insufficient strength, by the torque acting on the rotation shaft of the reduction gear. In such a case, even if the rotation shaft of the motor is set to a target angle reference value, the rotation shaft of the reduction gear may be twisted in the rotation direction by the torque acting on the rotation shaft of the reduction gear. In the conventional rotary drive device, if the rotation shaft of the reduction gear is shifted from the ideal position due to twisting like this, high-precision positioning becomes difficult. Accordingly, it is difficult to improve the precision of movement, such as linear movement, of robot arms. Furthermore, vibration of the rotation shaft of the reduction gear cannot be suppressed because of insufficient strength of the reduction gear. This increases the settling time and, hence, the time before starting the operation of the robot arm.

More specifically, the provision of an origin sensor on the rotation shaft of the reduction gear, as in the above-described conventional rotary drive device, is not enough for high-precision positioning, because it simply detects the position of the origin and, thus, the resolution of position detection is insufficient. Furthermore, even if the torque sensor is provided on the rotation shaft of the reduction gear, as in the above-described conventional rotary drive device, it is impossible to detect the amount of deformation of the inner mechanism or the amount of shift of the rotation position of the rotation shaft, due to distortion, caused by the torque acting on the inner mechanism via the rotation shaft of the reduction gear. Therefore, it is impossible to position the rotation shaft of the reduction gear with high precision. In addition, detecting the rotational speed of the rotation shaft of the motor and the rotational speed of the rotation shaft of the reduction gear, as in the above-described conventional rotary drive device, does not mean detecting the torque acting on the rotation shaft of the reduction gear or detecting the rotation position of the rotation shaft of the reduction gear. Therefore, it is impossible to position the rotation shaft of the reduction gear with high precision.

Accordingly, the present invention provides a rotary drive device for a robot arm with an increased positioning precision of the rotation shaft of the reduction gear, which can suppress vibration of the robot arm by torque control and reduce the settling time.

SUMMARY OF THE INVENTION

The present invention provides a rotary drive device including a servo motor, a reduction gear configured to reduce the rotational speed of a rotation shaft of the servo motor, a current control unit configured to supply current to the servo motor according to a current reference value, a controller configured to output an angle reference value of a rotation shaft of the reduction gear, a first angle-detecting unit configured to detect the rotation angle of the rotation shaft of the servo motor and output a first rotation angle that can be obtained by dividing the detection result by the reduction ratio of the reduction gear, a second angle-detecting unit configured to detect the rotation angle of the rotation shaft of the reduction gear and output the detection result as a second rotation angle, a torque calculation unit configured to calculate the torque acting on the rotation shaft of the reduction gear by multiplying the angle difference between the first rotation angle and the second rotation angle by the torsional stiffness of the reduction gear, an angle-control unit configured to generate a torque reference value needed to bring the second rotation angle close to the angle reference value according to the difference between the angle reference value and the second rotation angle, and a torque control unit configured to generate the current reference value needed to bring the torque close to the torque reference value according to the difference between the torque reference value and the torque.

Furthermore, the present invention provides a rotary drive device including a servo motor, a reduction gear configured to reduce the rotational speed of a rotation shaft of the servo motor, a current control unit configured to supply current to the servo motor according to a current reference value, a controller configured to output an angle reference value of a rotation shaft of the reduction gear and selects one of first and second operation modes, a first angle-detecting unit configured to detect the rotation angle of the rotation shaft of the servo motor and output a first rotation angle that can be obtained by dividing the detection result by the reduction ratio of the reduction gear, a second angle-detecting unit configured to detect the rotation angle of the rotation shaft of the reduction gear and output the detection result as a second rotation angle, a torque calculation unit configured to calculate the torque acting on the rotation shaft of the reduction gear by multiplying the angle difference between the first rotation angle and the second rotation angle by the torsional stiffness of the reduction gear, when the first operation mode is selected, a first angle-control unit configured to generate a torque reference value needed to bring the second rotation angle close to the angle reference value according to the difference between the angle reference value and the second rotation angle, when the first operation mode is selected, a torque control unit configured to generate the current reference value needed to bring the torque close to the torque reference value according to the difference between the torque reference value and the torque, an angle-conversion calculation unit configured to generate an output reference value by multiplying the angle reference value by a value obtained by dividing the resolution of the second angle-detecting unit by the resolution of the first angle-detecting unit, when the second operation mode is selected, and a second angle-control unit configured to generate the current reference value needed to bring the first rotation angle close to the output reference value according to the difference between the output reference value and the first rotation angle.

According to the present invention, because the rotation angle of the rotation shaft of the reduction gear is controlled according to the detection result of the second angle-detecting unit, even if the rotation position of the rotation shaft of the reduction gear is shifted with respect to the rotation shaft of the servo motor, due to insufficient strength or distortion of the reduction gear, it is possible to position the rotation shaft of the reduction gear with high precision. This increases the precision of movement, such as linear movement, of the robot arm. Furthermore, because the torque based on the torsional stiffness of the reduction gear is calculated using the detection results of the first angle-detecting unit and second angle-detecting unit, and the torque control is performed according to this calculation result, the vibration of the robot arm can be suppressed without using a torque sensor. Thus, it is possible to prevent extension of the settling time due to insufficient strength of the reduction gear, and it is possible to reduce the time before starting the operation of the robot arm.

Further features of the present invention will become apparent from the following description of exemplary embodiments with reference to the attached drawings.

DESCRIPTION OF THE EMBODIMENTS

Figure 1:
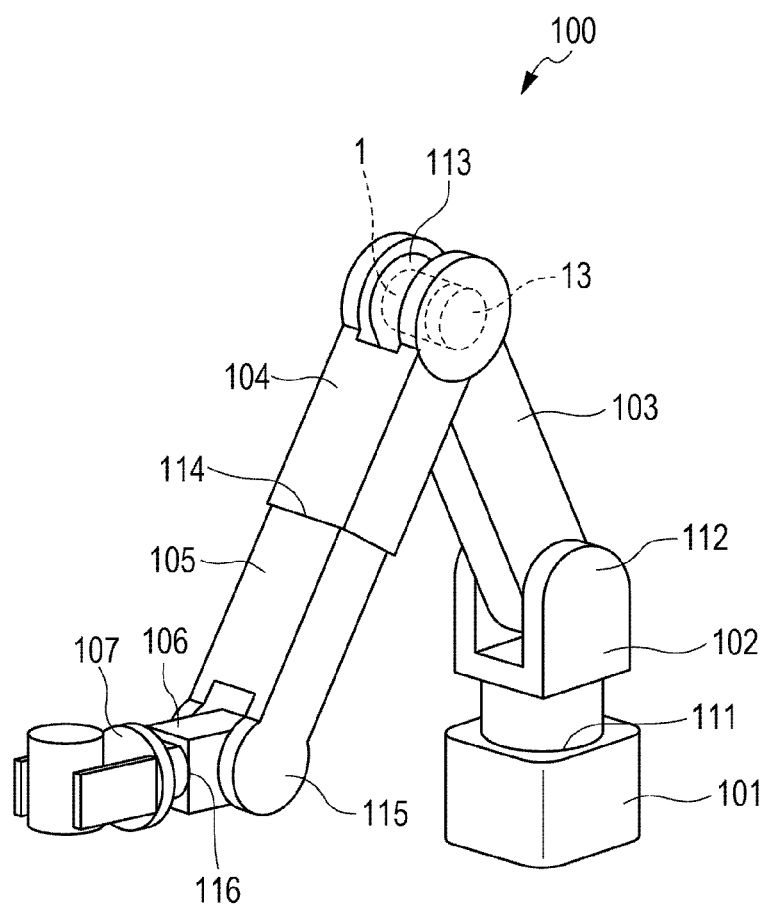
FIG. 1 is a perspective view of a robot arm according to a first embodiment of the present invention.

Referring to the drawings, embodiments of the present invention will be described in detail below.

First Embodiment

FIG. 1 is a perspective view of a robot arm according to a first embodiment of the present invention. A robot arm 100 includes a base 101 fixed to an operation table, a swivel portion 102 that is supported by the base 101 in a manner capable of swiveling, and a first link 103 that is supported by the swivel portion 102 so as to be capable of swinging. Furthermore, the robot arm 100 includes a second link 104 that is supported by the first link 103 so as to be capable of swinging, and a third link 105 that is supported by the second link 104 so as to be capable of advancing and retracting. Furthermore, the robot arm 100 includes a tip link 106 that is supported by the third link 105 so as to be capable of swinging and a hand 107 provided on the tip link 106. These components are joined to one another by a first joint portion 111, a second joint portion 112, a third joint portion 113, a fourth joint portion 114, a fifth joint portion 115, and a sixth joint portion 116. Each of the joint portions 111 to 116 includes a servo motor 1 and a reduction gear 13 for reducing the rotational speed of the servo motor 1. The rotation shafts of the reduction gears 13 are connected to the respective components 102 to 106 to drive them.

Figure 2:
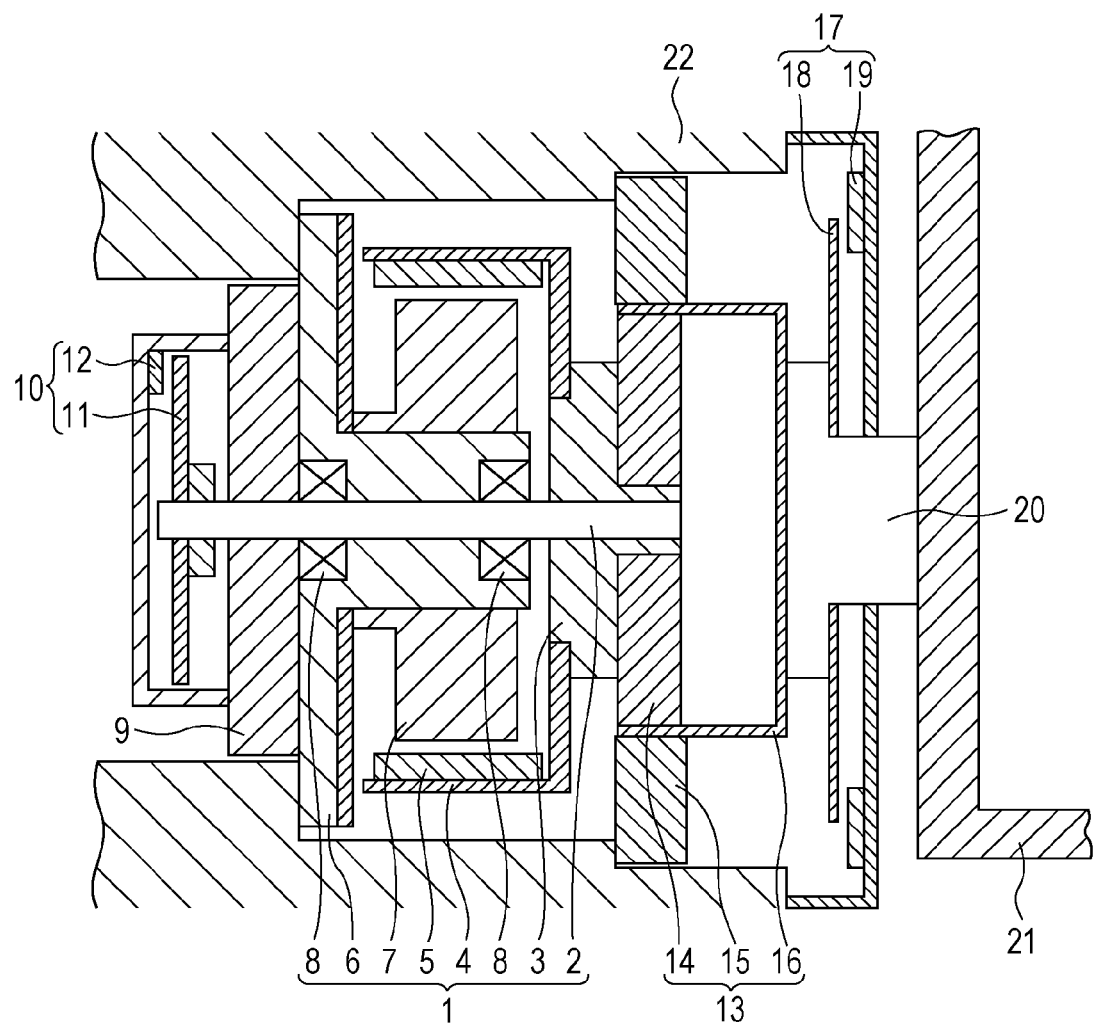
FIG. 2 is a cross-sectional view of a joint portion in FIG. 1.

FIG. 2 is a cross-sectional view of the joint portion 113 in FIG. 1. As shown in FIG. 2, a rotary member of the servo motor 1 includes a rotation shaft 2 that serves as an output shaft, a flange 3, a rotor yoke 4, and a rotor magnet 5. A stator coil 7 is attached to a motor housing 6, and a bearing 8 supports the rotary member.

A brake unit 9 is attached to an end of the rotation shaft 2 of the servo motor 1. Furthermore, a first encoder unit 10 that detects the rotation angle (angle position) of the rotation shaft 2 is attached to the end of the rotation shaft 2. The first encoder unit 10 is a reflection-type encoder unit including an encoder scale 11 that is fixed to the rotation shaft 2 and has a circumferentially provided slit and an encoder head 12 that is disposed opposite the encoder scale 11. The encoder head 12 is fixed to a frame 22, which is a fixed member on the first link 103 (FIG. 1) side. The reduction gear 13 with a reduction ratio of N is attached to the other end of the rotation shaft 2.

The reduction gear 13 is a harmonic drive (registered trademark). The reduction gear 13 includes a wave generator 14 joined to the rotation shaft 2 of the servo motor 1 and an annular rigid internal gear 15 fixed to the frame 22. Furthermore, the reduction gear 13 includes a flexible external gear 16 that is disposed between the wave generator 14 and the annular rigid internal gear 15 and rotates at a speed reduced from the rotational speed of the wave generator 14 by the reduction ratio N. The rotation shaft 20, serving as an output shaft, is fixed to this flexible external gear 16 so as to be coaxial with the rotation shaft 2. The rotation shaft 20 is joined to a frame 21 on the second link 104 (FIG. 1) side, which is the object to be driven. Note that the servo motor 1 and the annular rigid internal gear 15 of the reduction gear 13 are also fixed to the frame 22.

A second encoder unit 17 that detects the rotation angle (angle position) of the rotation shaft 20 is provided on the rotation shaft 20 of the reduction gear 13. The second encoder unit 17 is a reflection-type encoder unit including an encoder scale 18 that is fixed to the rotation shaft 2 and has a circumferentially provided slit and an encoder head 19 that is disposed opposite the encoder scale 18. Because the reflection-type encoder units 10 and 17 are smaller in thickness than a transmission type encoder, the space can be saved.

Figure 3:
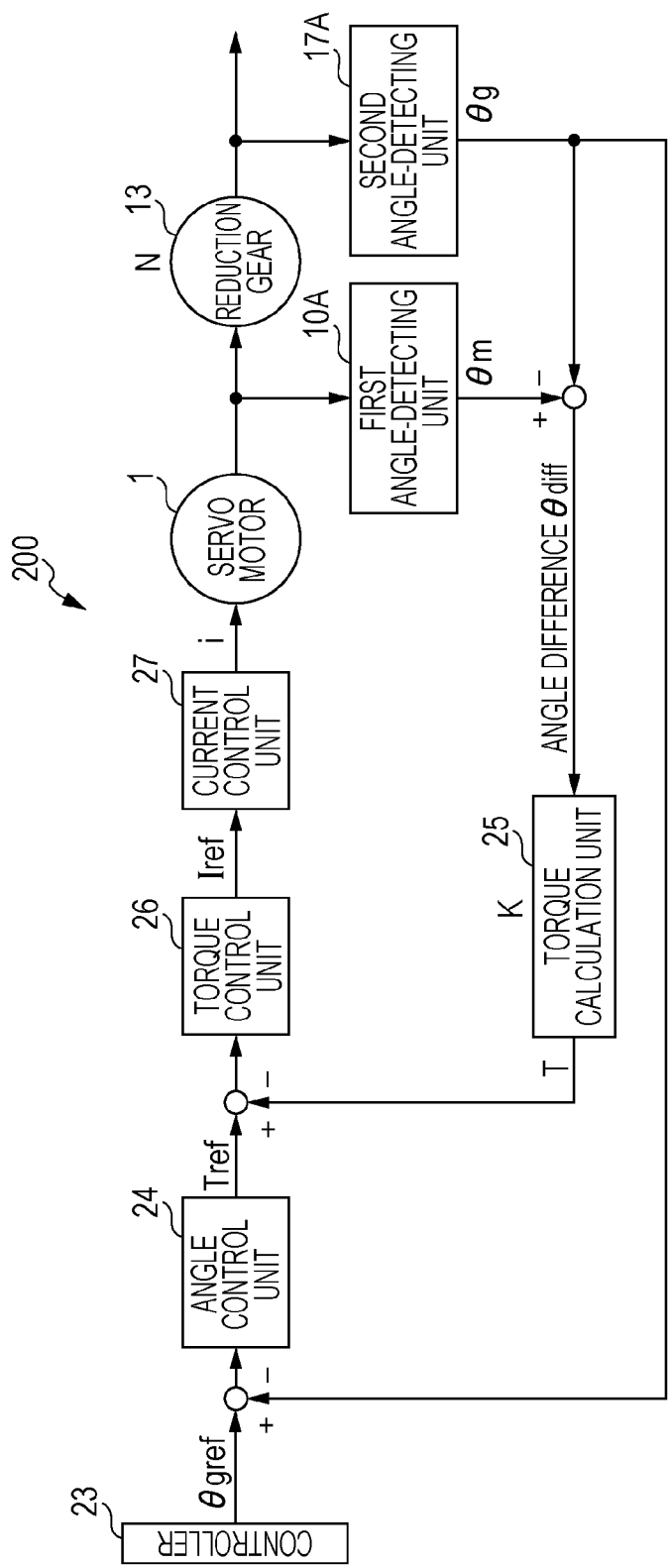
FIG. 3 is a control block diagram of a rotary drive device according to the first embodiment of the present invention.

FIG. 3 is a control block diagram of a rotary drive device 200 according to the first embodiment of the present invention. The rotary drive device 200 includes the above-described servo motor 1 and the reduction gear 13 with a reduction ratio of N, which is provided on the output side of the servo motor 1. The rotary drive device 200 includes the above-described first encoder unit 10 and a first angle-detecting unit 10A that detects the rotation angle of the rotation shaft 2 of the servo motor 1 and outputs a first rotation angle $\theta m$ that can be obtained by dividing the detection result by the reduction ratio, N, of the reduction gear 13. Furthermore, the rotary drive device 200 includes the above-described second encoder unit 17 and a second angle-detecting unit 17A that detects the rotation angle of the rotation shaft 20 of the reduction gear 13 and outputs the detection result as a second rotation angle $\theta g$.

Furthermore, the rotary drive device 200 includes a controller 23, an angle-control unit 24, a torque calculation unit 25, a torque control unit 26, and a current control unit 27. The controller 23 outputs an angle reference value $\theta gref$ serving as a target rotation angle of the rotation shaft 20 of the reduction gear 13.

The angle-control unit 24 calculates a torque reference value Tref serving as a target torque of the rotation shaft 20, such that the second rotation angle $\theta g$ from the second angle-detecting unit 17A is equal to the angle reference value $\theta gref$.

In other words, the angle-control unit 24 generates the torque reference value Tref of the rotation shaft 20 needed to bring the second rotation angle θg from the second angle-detecting unit 17A close to the angle reference value θgref according to the difference θgref−θg. That is, the angle-control unit 24 calculates the torque reference value Tref by PID-controlling the position feedback loop. This is because the equivalent transformation of the position and speed feedback loops into the position feedback is equivalent to the PID-controlled position feedback loop.

The torque calculation unit 25 calculates the torque T acting on the rotation shaft 20 of the reduction gear 13, from an angle difference θdiff between a first rotation angle θm, which is the output of the first angle-detecting unit 10A, and a second rotation angle θg, which is the output of the second angle-detecting unit 17A. The torque T is calculated by multiplying the angle difference θdiff by a torsional stiffness K, which represents the stiffness of the reduction gear 13.

The torque control unit 26 calculates the current reference value such that the torque T is equal to the torque reference value Tref. In other words, the torque control unit 26 generates a current reference value Iref needed to bring the torque T close to the torque reference value Tref according to the difference Tref−T. The current control unit 27 supplies a current i corresponding to the current reference value Iref to the servo motor 1.

In the above-described rotary drive device 200, when the servo motor 1 is rotationally driven, the angle difference θdiff occurs between the first rotation angle θm, which is the output of the first angle-detecting unit 10A, and the second rotation angle θg, which is the output of the second angle-detecting unit 17A, due to the influence of the stiffness K of the reduction gear 13. This angle difference θdiff represents a twisting angle by which the rotation shaft 20 of the reduction gear 13 is twisted in the rotation direction from the ideal position. That is, because the angle reference value θgref from the controller 23 and the second rotation angle θg of the second angle-detecting unit 17A do not match because of the torsional stiffness K of the reduction gear 13, the angle-control unit 24 recalculates the torque reference value Tref such that θgref is equal to θg. The torque control unit 26 recalculates the current reference value Iref such that the recalculated torque reference value Tref is equal to the torque T calculated from the angle difference θdiff, and the current i is outputted to the servo motor 1 via the current control unit 27. Thus, the position control and the torque control for bringing the second rotation angle θg and the torque T close to the angle reference value θgref and the torque reference value Tref, which are the targets, can be performed by the feedback control.

Specific numerical examples will be described below. A reflection-type encoder with 2500 pulses/rotation, which is multiplied by four, is used as the first angle-detecting unit 10A. A reflection-type encoder with 3000 pulses/rotation, which is electrically divided into 200 segments as the second angle-detecting unit 17A. A harmonic drive (registered trademark) reduction gear with a reduction ratio of 100:1 (N=100) and a torsional stiffness K of $0.44 \times 10^4$ Nm/rad is used as the reduction gear 13. The torque constant of the servo motor 1 is 0.04 Nm/A. At this time, the resolution of the first angle-detecting unit 10A at the rotation shaft is 6.28 μrad/pulse, and the resolution of the second angle-detecting unit 17A at the rotation shaft is 10.5 μrad/pulse.

At this time, when a force of 1 N is applied to a 500 mm position of the frame 21, which is the object to be driven, a torque of 0.5 Nm acts on the rotation shaft 20, causing a deformation of 113.6 μrad in the rotation shaft 20, due to the torsional stiffness K of the reduction gear 13. Therefore, if control is performed only by the first angle-detecting unit 10A, an error of 57 μm is generated. In the first embodiment, however, by performing angle-and-position control by the second angle-detecting unit 17A, control can be performed with a resolution of 10.5 μrad. Thus, it is possible to perform high-precision positioning with a position precision of about 5 μm.

Furthermore, if a disturbance torque or a vibration of 0.5 Nm as above is exerted while a highly precise operation, such as linear movement, is performed, the torque calculation unit 25 calculates the torque T from the angle difference θdiff between the first rotation angle θm and the second rotation angle θg. The current reference value Iref is calculated from the difference between this calculated torque T and the torque reference value Tref generated by the torque control unit 26, and the current control unit 27 outputs the current i corresponding to the current reference value Iref to the servo motor 1. In this case, because the disturbance torque is 0.5 Nm, the current i that is corrected by 0.125 A, from the reduction ratio, N, of the reduction gear 13 (=100) and the torque constant of the servo motor 1, is outputted to the servo motor 1. Thus, the exerted disturbance torque can be canceled and the position precision of the rotation shaft 20 of the reduction gear 13 can be maintained high. By performing these torque control and angle-and-position control while the robot arm 100 is in a stationary state, the settling time of the robot arm 100 can be reduced.

According to the first embodiment, the rotation angle of the rotation shaft 20 of the reduction gear 13 is controlled according to the detection result of the second angle-detecting unit 17A. Accordingly, even if the rotation position of the rotation shaft 20 of the reduction gear 13 is shifted by a twisting angle (angle difference θdiff) with respect to the rotation shaft 2 of the servo motor 1, due to insufficient strength or distortion of the reduction gear 13, it is possible to position the rotation shaft 20 of the reduction gear 13 with high precision. This increases the precision of movement, such as linear movement, of the robot arm 100. Furthermore, because the torque T based on the torsional stiffness K of the reduction gear 13 is calculated using the detection results of the first angle-detecting unit 10A and second angle-detecting unit 17A, and the torque control is performed according to this calculation result, the vibration of the robot arm 100 can be suppressed without using a torque sensor. Thus, it is possible to prevent extension of the settling time due to insufficient strength of the reduction gear 13, and it is possible to reduce the time before starting the operation of the robot arm 100.

While the joint portion 113 of the robot arm 100 has been described above, the joint portions 111 to 116 can also be controlled in the same way. In such cases too, it is possible to perform high-precision positioning of the robot arm 100 and to improve the precision of movement, such as linear movement. Furthermore, because the torque control is possible, the vibration of the robot arm 100 can be suppressed. Thus, it is possible to reduce the settling time and to reduce the waiting time before starting the movement of the robot arm 100.

Second Embodiment

Figure 4:
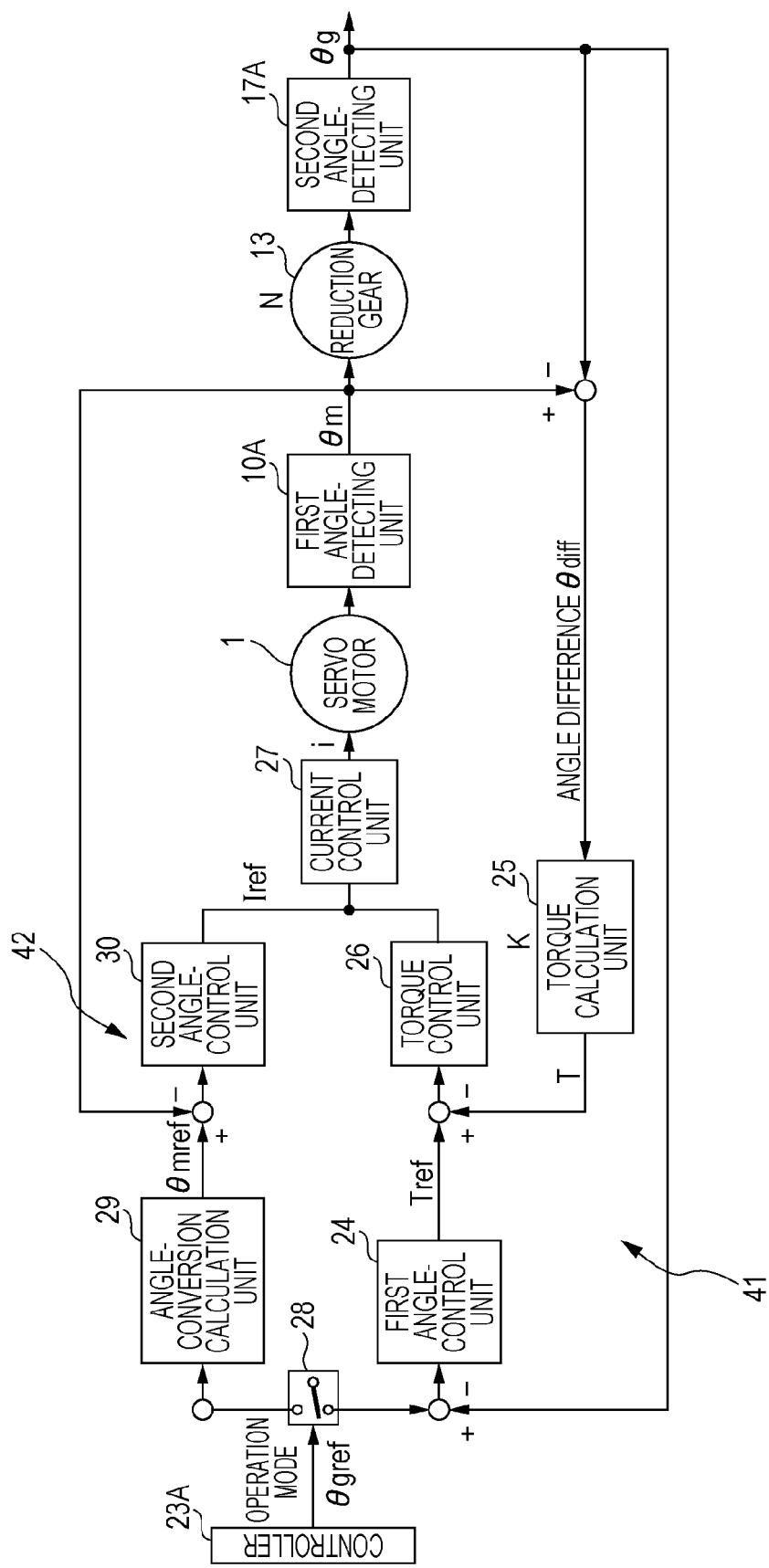
FIG. 4 is a control block diagram of a rotary drive device according to a second embodiment of the present invention.

Next, a rotary drive device 200A according to a second embodiment will be described with reference to FIG. 4. FIG. 4 is a control block diagram of the rotary drive device 200A according to the second embodiment of the present invention. In the second embodiment, the controller 23A not only outputs the angle reference value θgref, which is the target rotation angle of the rotation shaft 20 of the reduction gear 13, but also selects one of a first operation mode A and a second operation mode B. The selection of the operation mode by the controller 23A may be performed by a user operating an input device (not shown) or according to an operation program for moving the robot arm 100 (FIG. 1).

Furthermore, the rotary drive device 200A includes the servo motor 1, the reduction gear 13, the first angle-detecting unit 10A, the second angle-detecting unit 17A, the torque calculation unit 25, the torque control unit 26, and the current control unit 27, which have the same configurations as those in the first embodiment. Note that, in the second embodiment, the rotary drive device 200A includes the first angle-control unit 24 having the same configuration as the angle-control unit according to the first embodiment. In addition, in the second embodiment, the rotary drive device 200A includes a mode-changing switch 28, an angle-conversion calculation unit 29, and a second angle-control unit 30. The first angle-control unit 24, the torque calculation unit 25, and the torque control unit 26 constitute a first control loop 41, and the angle-conversion calculation unit 29 and the second angle-control unit 30 constitute a second control loop 42.

The mode-changing switch 28 changes between the first control loop 41 and the second control loop 42 to which the angle reference value θgref is outputted, according to an operation mode signal from the controller 23. The operation mode signal indicates the selected operation mode. When the first operation mode A is selected, the mode-changing switch 28 is turned to the first control loop 41 side, allowing the angle reference value θgref to be outputted to the first control loop 41. In this case, the rotary drive device 200A moves in the same manner as the rotary drive device 200 according to the first embodiment. In contrast, when the second operation mode B is selected, the mode-changing switch 28 is turned to the second control loop 42 side, allowing the angle reference value θgref to be outputted to the second control loop 42. In this case, the operation is different from that according to the first embodiment.

The angle-conversion calculation unit 29 needs to calculate a reduced value because the angle reference value θgref is instructed on the basis of the resolution of the second angle-detecting unit 10A. Therefore, when the second operation mode B is selected, an output reference value θmref is generated by multiplying the angle reference value θgref by the reduced value obtained by dividing the resolution of the second angle-detecting unit 17A by the resolution of the first angle-detecting unit 10A. For example, in the numerical example of the first embodiment, when the resolution of the first angle-detecting unit 10A is 6.28 μrad/pulse, and the resolution of the second angle-detecting unit 17A is 10.5 μrad/pulse, the reduced value is about 1.67.

The second angle-control unit 30 calculates the current reference value such that the first rotation angle θm, which is the output of the first angle-detecting unit 17A, is equal to the output reference value θmref, on the basis of the output reference value θmref. In other words, the second angle-control unit 30 generates, by calculation, the current reference value Iref needed to bring the first rotation angle θm close to the output reference value θmref according to the difference between the output reference value θmref and the first rotation angle θm.

The current control unit 27 inputs the current reference value Iref from the torque control unit 26 when the first operation mode A is selected, and inputs the current reference value Iref from the second angle-control unit 30 when the second operation mode B is selected. Then, the current control unit 27 supplies the current i corresponding to the current reference value Iref to the servo motor 1.

In the first operation mode A, the same control as the first embodiment is performed. Thus, it is possible to position the robot arm 100 with high precision and to suppress the vibration of the robot arm 100.

On the other hand, in the second operation mode B, the control loop is simple, and the control is performed only by detecting the angle of the rotation shaft 2 of the servo motor 1. Thus, a high-speed movement, such as a high-speed operation or a quick start-up motion, becomes possible. As has been described above, changing the operation mode makes it possible to perform a high speed movement of the robot arm 100, to position the robot arm with high precision, and to suppress vibration.

Although the present invention has been described according to the above-described embodiments, the present invention is not limited thereto. While a case in which the reduction gear 13 is a harmonic drive (registered trademark) has been described in the above-described embodiments, the same advantages can be obtained by using other reduction gears, such as a planetary gear.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-037527 filed Feb. 23, 2010, which is hereby incorporated by reference herein in its entirety.

What is claimed is:

1. A rotary drive device comprising:
a servo motor;
a reduction gear;
a current control unit configured to supply current to the servo motor according to a current reference value;
a controller configured to output an angle reference value of a rotation shaft of the reduction gear;
a first angle-detecting unit configured to detect the rotation angle of the rotation shaft of the servo motor and output a first rotation angle that can be obtained by dividing the detection result by the reduction ratio of the reduction gear;
a second angle-detecting unit configured to detect the rotation angle of the rotation shaft of the reduction gear and output the detection result as a second rotation angle;
a torque calculation unit configured to calculate the torque acting on the rotation shaft of the reduction gear by multiplying the angle difference between the first rotation angle and the second rotation angle by the torsional stiffness of the reduction gear;
an angle-control unit configured to generate a torque reference value needed to bring the second rotation angle close to the angle reference value according to the difference between the angle reference value and the second rotation angle; and
a torque control unit configured to generate the current reference value needed to bring the torque close to the torque reference value according to the difference between the torque reference value and the torque.

2. The rotary drive device according to claim 1, wherein the first angle-detecting unit and the second angle-detecting unit are reflection-type encoder units.

3. A rotary drive device comprising:
a servo motor;
a reduction gear;
a current control unit configured to supply current to the servo motor according to a current reference value;

a controller configured to output an angle reference value of a rotation shaft of the reduction gear and selects one of first and second operation modes;

a first angle-detecting unit configured to detect the rotation angle of the rotation shaft of the servo motor and output a first rotation angle that can be obtained by dividing the detection result by the reduction ratio of the reduction gear;

a second angle-detecting unit configured to detect the rotation angle of the rotation shaft of the reduction gear and output the detection result as a second rotation angle;

a torque calculation unit configured to calculate the torque acting on the rotation shaft of the reduction gear by multiplying the angle difference between the first rotation angle and the second rotation angle by the torsional stiffness of the reduction gear, when the first operation mode is selected;

a first angle-control unit configured to generate a torque reference value needed to bring the second rotation angle close to the angle reference value according to the difference between the angle reference value and the second rotation angle, when the first operation mode is selected;

a torque control unit configured to generate the current reference value needed to bring the torque close to the torque reference value according to the difference between the torque reference value and the torque;

an angle-conversion calculation unit configured to generate an output reference value by multiplying the angle reference value by a value obtained by dividing the resolution of the second angle-detecting unit by the resolution of the first angle-detecting unit, when the second operation mode is selected; and a second angle-control unit configured to generate the current reference value needed to bring the first rotation angle close to the output reference value according to the difference between the output reference value and the first rotation angle.

* * * * *